United States Patent [19]

Sleeper, Jr.

[11] 4,370,095
[45] Jan. 25, 1983

[54] COMPOUND COAXIAL WINDMILL

[76] Inventor: H. Prescott Sleeper, Jr., 500 Flemington Rd., Huntsville, Ala. 35802

[21] Appl. No.: 203,319

[22] Filed: Nov. 3, 1980

[51] Int. Cl.³ .............................................. F03D 1/02
[52] U.S. Cl. .................................... 416/175; 416/171; 416/170 R; 415/DIG. 1
[58] Field of Search .................. 416/171, 124, 170 A, 416/175 A; 415/DIG. 1, 2 A-4 A

[56] References Cited

U.S. PATENT DOCUMENTS

| | | | |
|---|---|---|---|
| 1,312,021 | 8/1919 | Dickinson et al. | 415/DIG. 1 X |
| 1,578,923 | 3/1926 | Schlotter | 415/4 A X |
| 1,851,513 | 3/1932 | Holmstrom | 415/DIG. 1 X |
| 1,857,509 | 5/1932 | Holmstrom | 415/DIG. 1 X |
| 2,004,853 | 6/1935 | Crary | 415/2 A |
| 2,017,961 | 10/1935 | Ferral | 415/3 A X |
| 4,047,832 | 9/1977 | Sforza | 415/DIG. 1 X |
| 4,075,500 | 2/1978 | Oman et al. | 415/DIG. 1 X |
| 4,087,196 | 5/1978 | Kronmiller | 416/189 A X |
| 4,132,499 | 1/1979 | Igra | 415/DIG. 1 X |
| 4,204,799 | 5/1980 | de Geus | 415/2 A |

FOREIGN PATENT DOCUMENTS

| | | | |
|---|---|---|---|
| 256035 | 11/1963 | Australia | 415/3 A |
| 33383 | 12/1924 | Denmark | 415/DIG. 1 |
| 729534 | 12/1942 | Fed. Rep. of Germany | 415/4 A |
| 1628257 | 5/1970 | Fed. Rep. of Germany | 415/2 A |
| 975625 | 3/1951 | France | 415/3 A |
| 540056 | 2/1977 | U.S.S.R. | 416/41 |

Primary Examiner—Everette A. Powell, Jr.
Attorney, Agent, or Firm—C. A. Phillips

[57] ABSTRACT

A horizontal axis windmill in which there is employed a conventional propeller mounted at one end of a fuselage housing a generator, and there is also located in the fuselage an induction fan. The fan functions to increase the volume of air moving through the propeller and in a direction coordinate with the direction of rotation of the propeller, thus to improve the efficiency of the windmill.

8 Claims, 6 Drawing Figures

COMPOUND COAXIAL WINDMILL

TECHNICAL FIELD

This invention relates to windmills, and particularly to an improved windmill of the horizontal axis type, employing two spaced rotors.

BACKGROUND ART

The most common windmill employs a single propeller rotating about a horizontal axis. A normal fraction of wind energy available from air flow to this type windmill is controlled by the interaction of the propeller with the ambient wind field and is limited by what is known as the Betz limit to 59% of the unperturbed wind energy over the area of rotation of the propeller. This limitation is for optimum design, and, practically, with most conventional two-bladed propellers, the efficiency factor is typically no greater than 40%. In an effort to provide improved efficiency, various augmenting structures have been proposed.

As most pertinent to the present invention, it has previously been proposed, as illustrated in U.S. Pat. No. 4,087,196, that two concentrically positioned propellers be employed, a large one and a small one, and that these be disposed at opposite ends of a conically-shaped shroud. Air enters the larger end of the shroud and is, in accordance with the patent, increased in velocity by an amount equal to the ratio of the outlet and inlet areas. The small propeller is then driven by air with this enhanced velocity. It, in turn, operates a generator, and, in one example, drives through a reduction gear the larger propeller at the inlet end of the shroud. Alternately, the inlet propeller may be driven by other means. The basic problem with employing a coupling shroud between propellers is that the shroud must be very large, and thus heavy and expensive, both to construct and to mount.

It is the object of the present invention to provide a windmill with enhanced efficiency, and at the same time one which employs certain smaller and less costly components than previously proposed.

DISCLOSURE OF THE INVENTION

In accordance with the present invention, a horizontal axis windmill is constructed in which a conventional propeller is mounted to the end of a shaft extending into and supported by a circular and elongated fuselage. The shaft is conventionally coupled to an electrical generator, also located in the fuselage. An induction fan is mounted within the fuselage, and it is driven at a speed higher than that of the typical operating speed of the propeller. There is provided an annular opening around the fuselage between the propeller and induction fan, and a conically-shaped baffle provides a tapered inlet surface between the fan and the outer region surrounding the fuselage and located between the opening and the propeller.

In one version of the invention, the propeller operates on an end of the fuselage facing the wind, and the induction fan draws in air through the propeller over the conical baffle due to the reduction of the air pressure in the region between the fan and the propeller. The increase in air flow rate through the propeller thereby increases the rotational speed of the propeller. The efficiency of the induction fan is increased with the aid of fixed directional vanes in the annular opening between the propeller and the fan, which enhance the rotational speed of the air impinging on the fan rotor.

In a second version of the invention, the propeller operates with the wind flowing along the fuselage to the propeller. The induction fan draws in air radially from an extended volume and increases the volume air flow and velocity to the propeller due to the reduced atmospheric pressure induced by the fan. The increase in volume air flow and velocity increases the speed of the propeller. The efficiency of the induction fan is increased with the aid of fixed directional vanes in the annular air entrance, which produce a rotational motion in the air impinging on the fan rotor.

In either version, the induction fan may be driven from the propeller drive axle through speed increasing gears or by an electric motor.

DETAILED DESCRIPTION OF THE DRAWINGS

Figures 1, 2, 3:
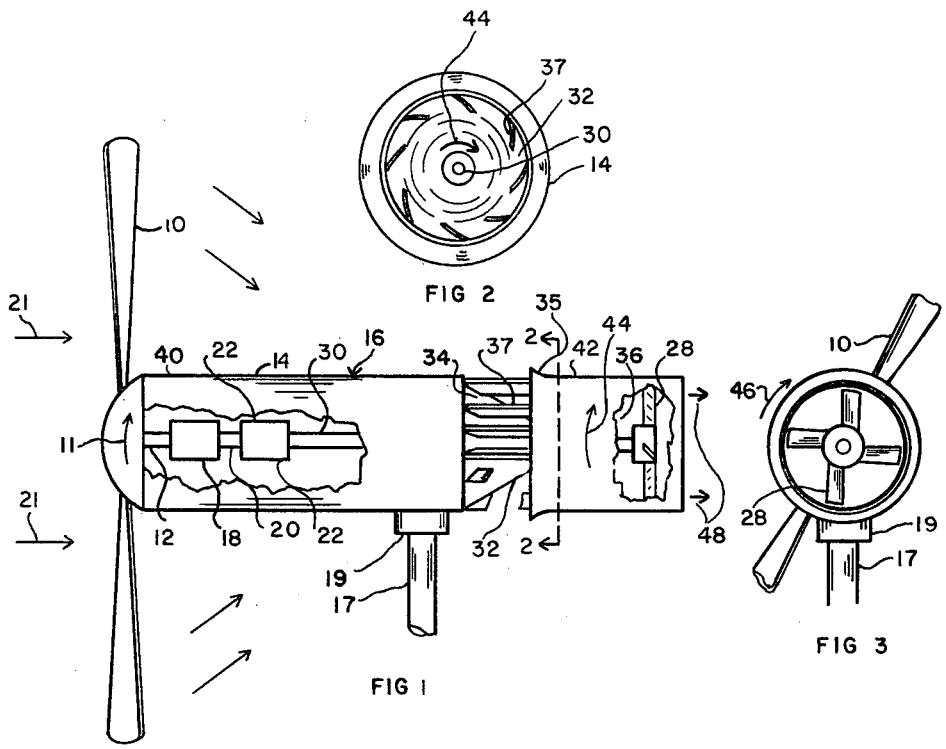
FIG. 1 is a side view of an embodiment of the invention.
FIG. 2 is a sectional view taken along line 2—2 of FIG. 1.
FIG. 3 is an end view of the structure shown in FIG. 1.

Referring to the drawings, and initially to FIGS. 1-3, propeller 10 is conventionally mounted on an axle or shaft 12, in turn rotationally supported within fuselage 14 of windmill 16 (by means not shown). It operates into the wind, which would be blowing in the direction of arrows 21. Propeller 10 may be of any type conventionally employed by a windmill. Thus, it may have two or more blades, or it may be in the form of a multivane turbine. Typically, propeller 10, rotating in the direction of arrow 11, drives shaft 12 at a speed of 10 to 100 rpm, which speed is increased by gear box 18 by a factor of 10 to 50, gear box 18 being coupled to shaft 12. Increased speed is provided by output shaft 20, which then drives generator 22. An electrical output of generator 22 is provided by electrical leads (not shown). Induction fan 28 (FIG. 3) is positioned within a shroud provided by a section of fuselage 14 and is driven by shaft 30, which is an extension of the shaft of generator 22, and thus is driven at a stepped-up speed with respect to the speed of rotation of propeller 10. Windmill 16 is rotatably supported on a pole 17, or other support, by a bushing or bearing member 19.

Conically-shaped baffle 32 is positioned within fuselage 14 forward of fan 28 (between fan 28 and propeller 10), and air around the fuselage is drawn in through opening 34 and then over baffle 32 by fan 28. The trailing edge 35 of opening 34 is flared outward to extend the air capture area. Air is drawn into plenum chamber 36 formed within fuselage 14 just forward of fan 28. Vanes 37, which are positioned around baffle 32 in opening 34, are particularly illustrated in FIG. 2. They attach between baffle 32 and an underside of fuselage 14 and provide both an air directive role and provide for structural continuity between the forward portion 40 and after portion 42 of fuselage 14. The vanes extend rearward toward, but stop short of, fan 28. They are set at an angle of approximately 45° with respect to a radial direction and have a slight concave shape on their face (as shown in FIG. 2). As a result, the air drawn in by fan 28 is given a rotational movement, forming a vortex, in the direction shown by arrow 44, which is in the same direction as that of the rotation of fan 28, as indicated by arrow 46. As a result of this rotational effect, fan 28 is able to draw in and exhaust a greater volume of air, which will enhance its function, as will be described. Air exhaust is from the rear of fuselage 14, as indicated by arrow 48.

In operation, the effect of the air exhausted by fan 28 is to reduce the air pressure in plenum chamber 36 and around fuselage 14 forward of baffle 32, which in turn increases the velocity of air impinging on propeller 10, and thus results in an increase in speed of rotation of the propeller. The volume of air flow available to the propeller is also increased by the said reduction in air pressure.

Figure 6:
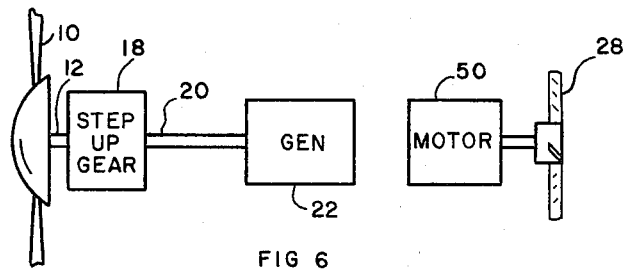
FIG. 6 is a schematic illustration of an alternate form of drive system to that shown in FIG. 5.
Figure 5:
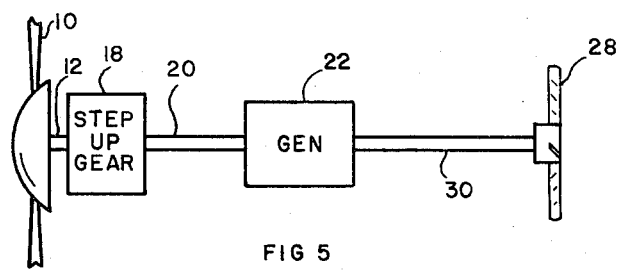
FIG. 5 is a schematic illustration relating to the system of drive of the induction fans employed by the embodiments of the invention shown in FIGS. 1 and 4.

FIG. 5 illustrates schematically the drive arrangement described above wherein fan 28 is driven through step up gear 18 by propeller 10. Alternately, fan 28 may be driven by electrical motor 50, as shown by the schematic illustration of FIG. 6. In the latter case, motor 50 is typically driven at a speed 5 to 100 times the speed of propeller 10 by power supplied through leads (not shown).

Figure 4:
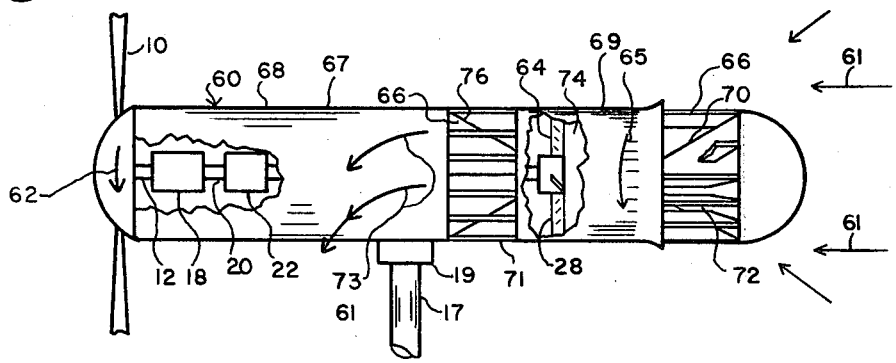
FIG. 4 is a side view of an alternate embodiment of the invention.

FIG. 4 illustrates an alternate embodiment of the invention wherein windmill 60 is operated by the wind flowing in the opposite direction to that shown in FIG. 1, the direction of wind being indicated by arrows 61. The drive arrangement is the same as that described above with respect to FIGS. 1 and 5, and, alternately, it may be in the form of the drive shown in FIG. 6. As shown in FIG. 4, propeller 10, mounted on shaft 12, and turning in the direction of arrow 62, drives gear box 18, and in turn generator 22 and fan 64 in the direction shown by arrow 65. In this embodiment of the invention, the air induction is through opening 66 in fuselage 68 and passes over conical baffle 70 to induction fan 64. Vanes 72 are positioned on conical baffle 70 and are identical to those illustrated in FIG. 2 when viewed from left to right. The forward and after regions 67 and 69, respectively, of fuselage 68 are secured together by structural connecting members 71.

The operation of windmill 60 is as follows. Air flow is in the direction right-to-left, as indicated by arrows 61. Some of the air is drawn in plenum chamber 74 over conical baffle 70 by induction fan 64. By virtue of vanes 72, the air is caused to effect a rotary vortex motion in a direction as indicated by arrow 65, which is the same as the direction of rotation of induction fan 64. The outlet air from induction fan 64 is exhausted outward over conical baffle 76, moving to the left, as indicated by arrows 73, and toward propeller 10. As a result, this air adds energy to the air that would otherwise surround fuselage 68, with the result that propeller 10 is driven at an enhanced speed. The radially inwardly moving air at opening 66 increases the net volume flow of air to propeller 10.

While the blades of the propeller and induction fan are simply indicated as being fixed, it is to be realized that they may be varied in pitch, and a variable pitch control may be employed with either or both of them to effect improved efficiency.

Where the configuration of the invention is as shown in FIG. 4, the incident wind will tend to keep the windmill oriented properly with respect to an incident wind direction. In the case of the configuration shown in FIG. 1, and optionally with respect to the configuration shown in FIG. 4, auxiliary means may be employed utilizing a wind direction sensor and a motor driven rotating gear system to effect orientation. Additionally, with respect to the windmill of FIG. 1, a proper orientation may be effected by a conventional tail wind vane.

To examine operating characteristics provided by this invention, it might first appear that operating losses by an induction fan as employed herein would offset any gains from its use. However, it is to be appreciated that induction fans, when of optimum design, are inherently high efficiency devices, as high as 85%, so that practically only a small amount of energy is lost in driving one from the propeller. This loss, however, is more than made up for by the benefits gained. The loss is partially compensated for by the vortex created in the plenum chamber due to the effect of the fixed vanes in the annular air entrance, controlling the rotary air flow to the fan. In operation, the fan produces a very significant reduction in atmospheric pressure within the plenum chamber upwind of the plane of the fan rotor, which increases the wind speed upwind and downwind of the fan, and this increases the volume flow of air to the propeller of the windmill. The increased volume flow of air to the propeller is produced by the wind field upwind of the induction fan, as modified by the induction fan. Streamlines of the wind field off the axis of the induction fan are modified, with a net inward radial velocity, to collect air from an area much larger than the induction fan. The modified wind field then influences the propeller such that a larger than normal volume of air flow, with a higher velocity, is available to drive the propeller.

Accordingly, for the reasons set forth, the efficiency of the applicant's system is no longer controlled by the 59% Betz limit for a conventional horizontal axis windmill; and, in fact, the overall efficiency may rise significantly above this figure.

While the weight of the added induction fan and increased length of the fuselage to provide for the fan and plenum chamber is of some significance, it is to be appreciated that the weight increase is clearly less than necessary for the system employing a shroud which extends completely between large and small area rotors. Thus, the gains in efficiency obtained by the present invention are obtained at a lesser weight penalty, and, accordingly, are economically attractive. Still further, the present system requires only a relatively small modification to conventional horizontal axis windmills, and modifications are simple. Finally, the streamlined fuselage providing a housing for the system generally enhances efficiency.

I claim:
1. A compound coaxial windmill comprising:
a support;
an elongated body;
an axle rotatably supported along an elongated dimension of said body and extending to one end of said body;
mounting means for rotatably supporting said body on said support about a vertical axis, an axis perpendicular to said axle;
a propeller of a diameter significantly larger than the cross-sectional dimensions of said body, and said propeller being attached to and adapted to drive said axle;

an air inlet extending around a peripheral region of said body spaced from said propeller, and a first baffle having a generally conical outer surface concentric with said axle, over which peripheral air passes through said inlet to an inner region of said body;

an induction fan positioned concentrically with respect to said outer conical surface and adapted to draw in air over said conical surface;

a first baffle positioned between said fan and an end of said body opposite to that having said propeller, with the small diameter end of said outer conical surface of said baffle being nearest to said fan;

a second baffle, between said fan and said propeller, having an outer conical surface concentric with said axle, and having its small end adjacent to the exit end of said fan adjacent to the exit air flow end of said fan, and an air outlet extending around a peripheral region of said body between said fan and said propeller;

drive means for generally driving said induction fan at a higher rotational rate than said propeller turns;

an electrical generator coupled to said shaft; and a plurality of vanes positioned in said air inlet, and over which vanes air would enter and then be drawn over said conical surface of said baffle by said induction fan, and said vanes being oriented with their surfaces lying generally in a plane parallel to the axis of said axle, but lying at an angle with respect to a radial line through the axis of said axle;

whereby entering air is drawn in from around the side of said body and flows inward over the conical surface of said first-named baffle, is driven rotationally in the same direction as the direction of rotation of said induction fan, is drawn through said fan and outward over said second baffle, and then flows generally along said body to said propeller.

2. A windmill as set forth in claim 1 wherein said propeller and induction fan rotate in the same direction.

3. A windmill as set forth in claim 1 wherein said drive means includes gear means connected to said axle for driving said fan from said propeller at a speed in excess of the speed of said propeller.

4. A windmill as set forth in claim 1 wherein said drive means comprises an electrical motor.

5. A windmill as set forth in claim 1 wherein said drive means includes gear means connected to said axle for driving said fan from said propeller at a speed in excess of the speed of said propeller.

6. A windmill as set forth in claim 1 wherein said drive means comprises an electrical motor.

7. A windmill as set forth in claim 1 wherein said induction fan is of an adjustable pitch type.

8. A windmill as set forth in claim 1 further comprising a second plurality of vanes about said second baffle, said vanes being oriented with their surfaces lying generally in a plane parallel to the axis of said axle, but lying at an angle with respect to a radial line through the axis of said axle.

* * * * *